April 28, 1964

J. J. DONOSO 3,131,050

SEALING SINTERING MACHINES

Filed Jan. 11, 1962

INVENTOR.
JULIUS J. DONOSO

BY
Harold F Wilhelm

ATTORNEY

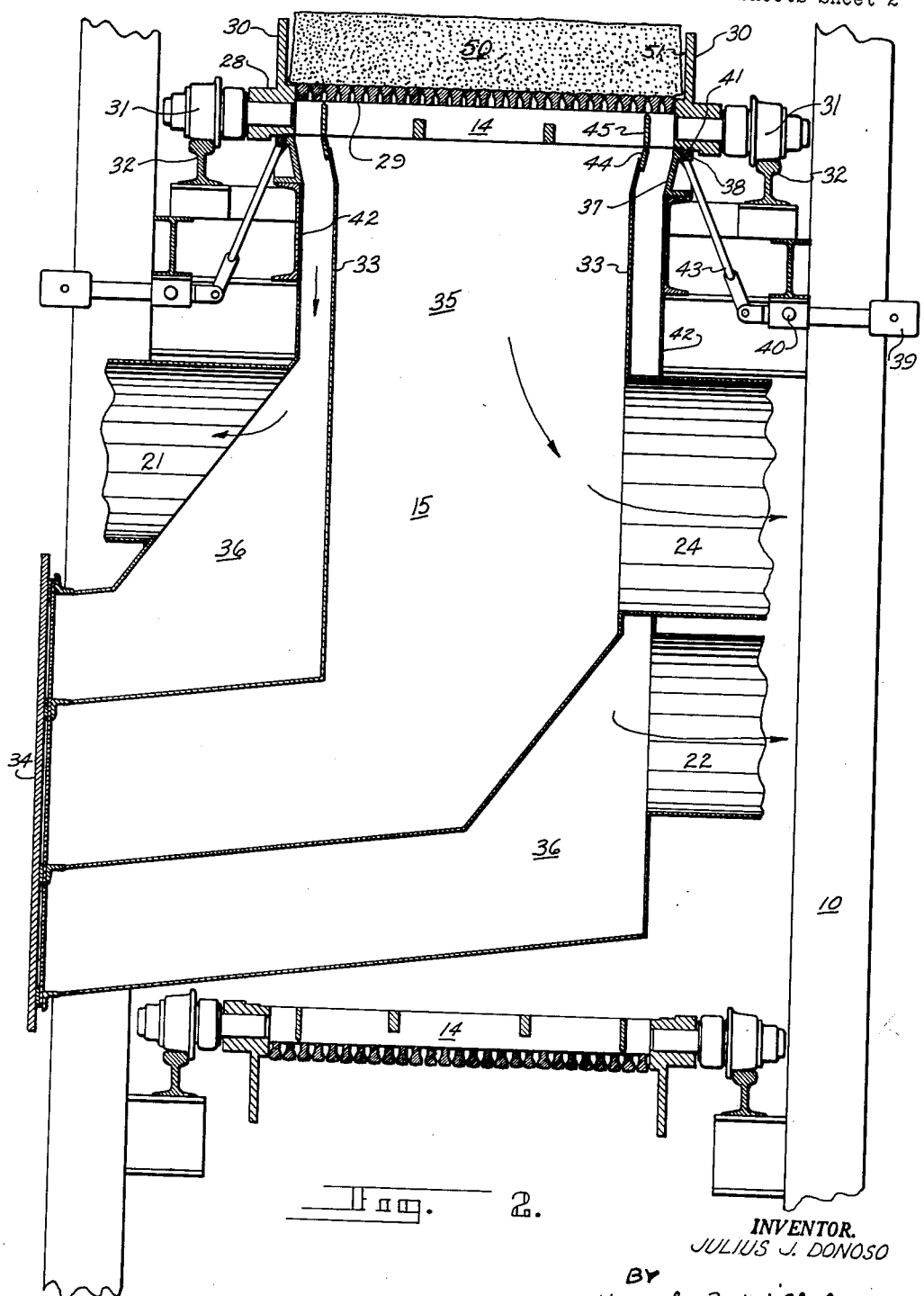

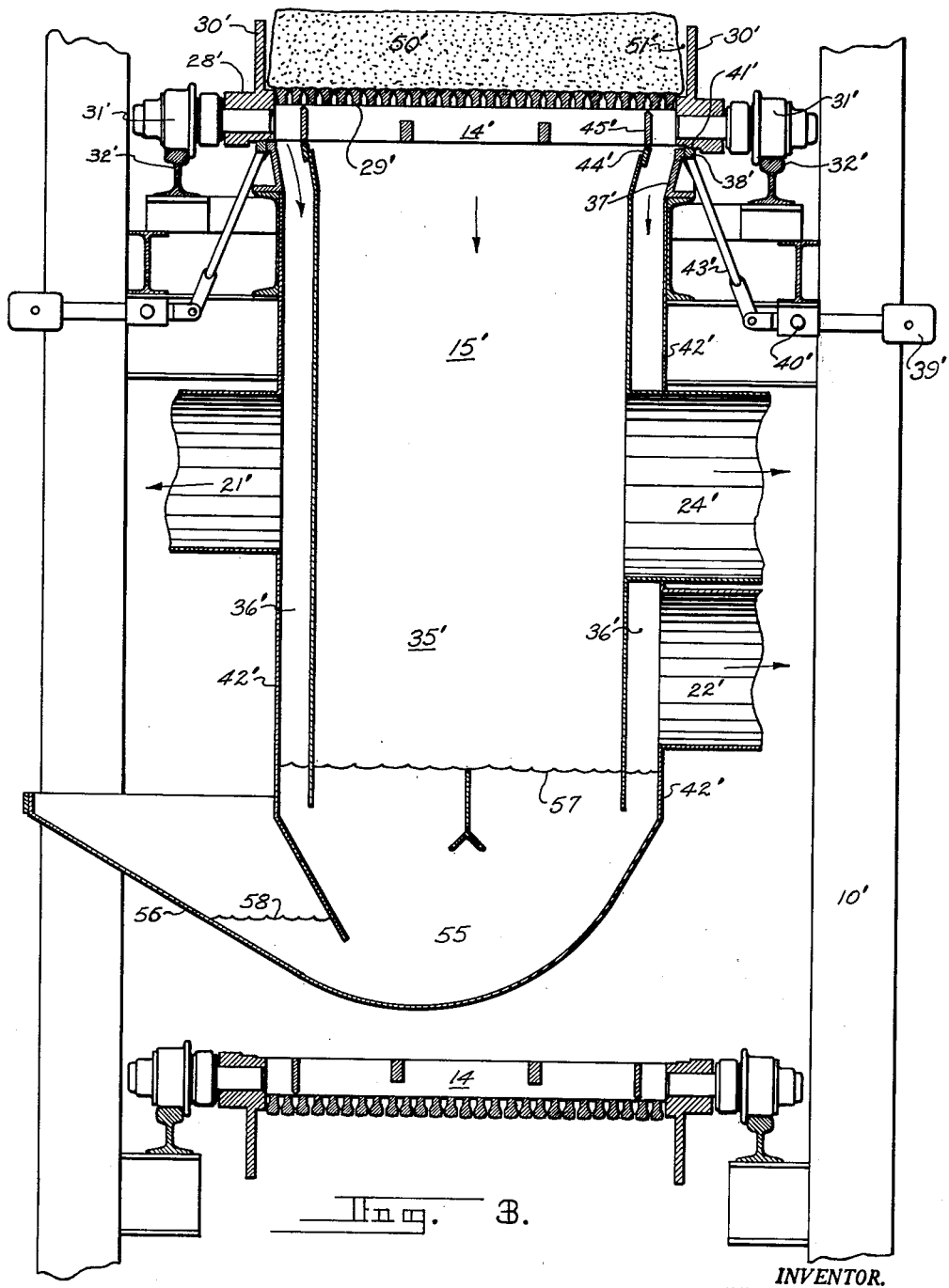

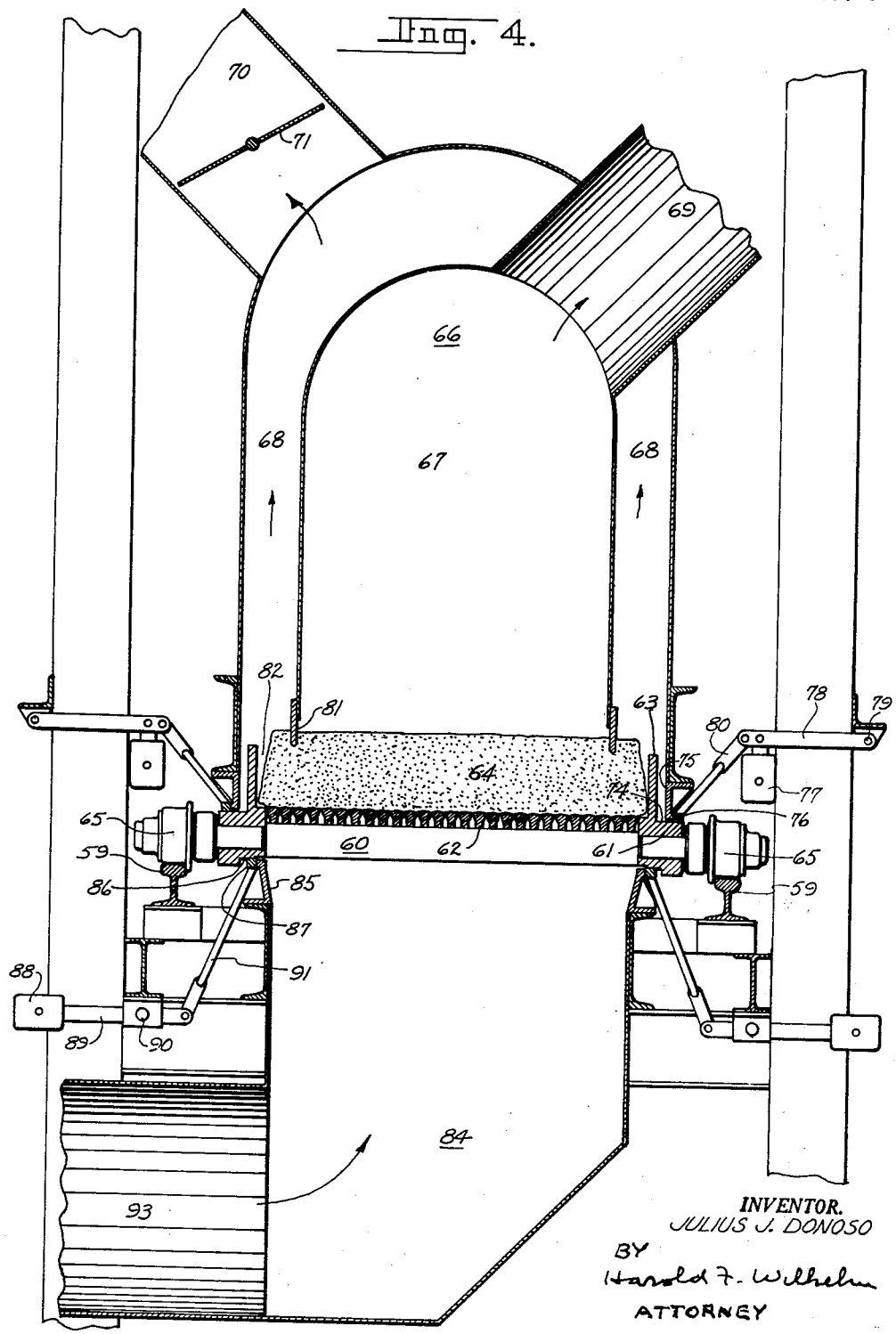

United States Patent Office 3,131,050
Patented Apr. 28, 1964

3,131,050
SEALING SINTERING MACHINES
Julius J. Donoso, Salt Lake City, Utah, assignor to American Smelting and Refining Company, New York, N.Y., a corporation of New Jersey
Filed Jan. 11, 1962, Ser. No. 165,564
8 Claims. (Cl. 75—5)

The invention relates to sintering ores, concentrates, and the like, and more particularly to sealing against leakage of air into sintering machines.

Sintering machines of the Dwight-Lloyd comprise a series of travelling grates or pallets moving over a suction or wind box which draws air down through the charge on the pallets. These machines are subject to air leakage both at the sides and ends of the sintering zone which extends from the place where the machine is charged to the place where the sintered cake is dumped.

The present invention relates especially to sealing against air leakage along the sides of the sintering zone. One point of air leakage is the contact between the bottoms of the pallets and the top longitudinally extending walls of the wind box. Another point of air leakage is the space adjacent the side walls of the pallets, caused by shrinkage of the charge away from the pallet side walls as it passes through the sintering zone.

This air leakage gives rise to a number of disadvantages among which are dilution of sinter gases, loss of pressure or vacuum, accelerated corrosion of parts which contain the sinter gases, and necessity for larger gas cleaning equipment and draft fans.

Various schemes have been heretofore proposed for overcoming these difficulties. For example, in sintering operations producing large quantities of sulphur dioxide gas, gas recirculation systems have been used to improve the grade of gas. To overcome leakage between the bottom of the pallets and the tops of the wind boxes, various types of sealing devices have been used. Vacuum tunnels have also been proposed, on the outside of the seals between pallets and wind boxes. To overcome the leakage due to shrinkage of the charge away from the side walls of the pallets, various mechanical devices have been proposed, including flanges projecting inwardly from the side walls of the pallets and overlying or interlocking with the charge.

Objects of the invention are to overcome one or more of the above disadvantages and to provide a system which is simple and inexpensive, and easily adapted to existing sintering machines.

According to a preferred form of the present invention, the pallets of a conventional down draft Dwight-Lloyd sintering machine, are provided with inner sealing bars, spaced inwardly from the outer seals. The wind box is provided with inner walls having sealing bars cooperating with the inner pallet sealing bars. The inner and outer seals divide the wind box into an inner section or wind box proper, and an outer or auxiliary section. A suction conduit is connected to the inner section for delivering the richer gases to a desired point as for example to a chemical plant. A separate suction conduit is connected to the outer or auxiliary section for delivering the weaker gases to a bag house or directly to atmosphere.

Gases drawn through the grates by the outer section will be largely air because of the shrinkage of the charge away from the sides of the pallets. This gas will be diluted also by leakage of the conventional outer seals. The gas delivered by the inner section, or wind box proper, will be of relatively high grade because all of it results from air being drawn from central sections of the charge where it is least subject to air leakage.

The invention is also applicable to updraft sintering machines where the wind box is located above the travelling grates or pallets. According to a preferred embodiment of this form, the wind box may be divided into inner and outer sections similarly to the downdraft form except that in the updraft form the inner sealing members comprise bars which extend into and below the top surface of the charge.

Other objects and features of the invention will be more apparent from the following description when considered with the following drawings in which:

FIG. 2 is a section, taken on the line 2—2 of FIG. 1, illustrating the wind box sealing arrangement of the invention for a down draft machine.

FIG. 3 is a section corresponding to FIG. 2, illustrating the sealing arrangement of the invention for a down draft machine equipped with a water clean-out seal.

FIG. 4 is a section corresponding to FIG. 2, illustrating the sealing arrangement of the invention for an up-draft machine.

Figure 1:
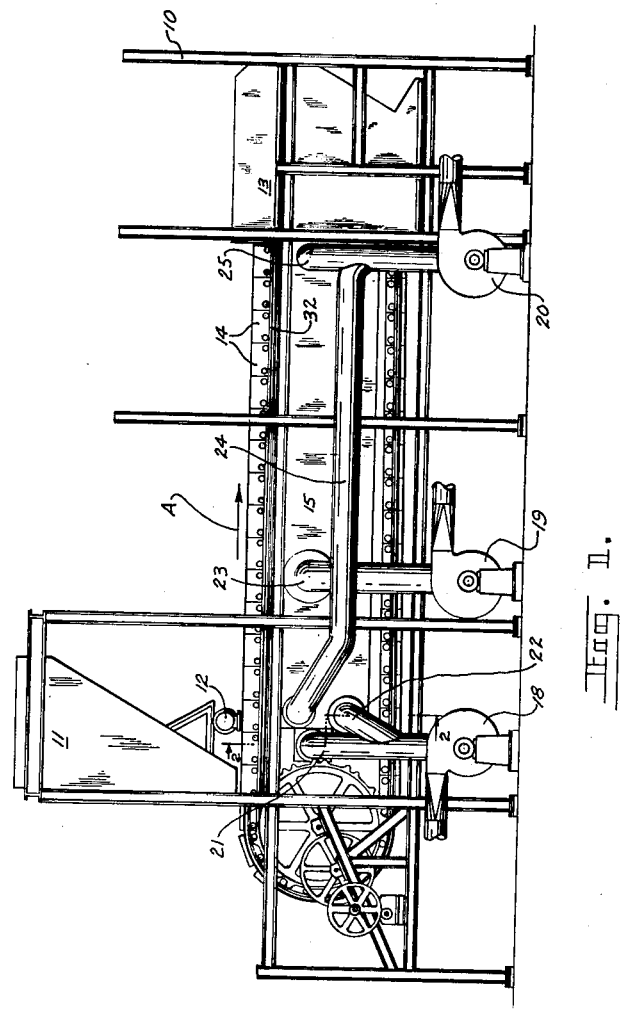
FIG. 1 is a side elevation of a conventional sintering machine to which the invention is applied.

In the following description and in the claims, various details will be identified by specific names for convenience, but they are intended to be as generic in their application as the art will permit.

Like reference characters denote like parts in the several figures of the drawings.

In the accompanying drawings and description forming part of this specification, certain specific disclosure of the invention is made for purposes of explanation, but it will be understood that the details may be modified in various respects without departure from the broad aspect of the invention.

Referring now to the drawings and more particularly to FIG. 1, the sintering machine comprises the usual frame 10 having a loading hopper 11, an ignition muffle 12, and a dumping compartment 13. The continuous band or conveyor for carrying the charge comprises a series of pallets 14 riding on tracks 32 over a wind box denoted generally by 15.

This machine is a conventional Dwight-Lloyd downdraft machine and hence it is not necessary to describe it in detail except as is necessary to understand the invention. It is sufficient to say that the conveyor moves in the direction of the arrow A (FIG. 1). The charge is fed on to the pallets 14 from the hopper 11. It is ignited by muffle 12 and the sintered charge is dumped at the dumping compartment 13. The pallets return along the lower reach of the endless trackway 32.

A series of suction fans 18, 19 and 20 are shown. Fan 18 connects with wind box 15 by conduits 21 and 22; fan 19 connects with the wind box by conduit 23; and fan 20 connects with the wind box by conduits 24 and 25. The specific parts of the wind box to which these conduits are connected and the function of the suction fans will be explained more in detail hereinafter.

Referring now to FIG. 2, the sealing arrangement for the down draft machine will now be described. Each pallet 14 comprises a frame 28 having a grate 29 and vertical side walls 30. Each pallet has wheels 31 running on tracks 32. It will be noted that one pallet 14 is shown riding in inverted position under the wind box 15; this pallet is returning from dumping compartment 13 to charging position to receive additional charge from hopper 11.

The wind box 15 comprises an inner section 35, or wind box proper, having walls 33 which walls slope to a clean out door 34. The wind box 15 also comprises an outer or auxiliary section 36 having walls 42 disposed on the outer sides of walls 33. The outer walls 42 also slope to the clean out door 34.

The outer walls 42 have sealing relation with the pallets 14. The wind box carries outer sealing strips 37 and the pallet carries sealing surfaces 41. Sealing bars 38 are yieldably held against sealing members 37 and 41 to seal the joints between the stationary outer wind box walls 42 and the movable pallet frames 28. The sealing bars 38 are held in position by weights 39 pivoted at 40, and operating through rods 43.

The inner walls 33 of the inner wind box section 35 also have sealing relation with the pallets 14. The pallets 14 carry inner longitudinal strips 45 on either side, and the wind box walls 33 carry sealing strips 44. Sealing strips 44 and 45 are spaced by a small gap, or they may be arranged to yieldably engage each other.

The several conduits 22–25 are connected to different parts of the wind box, both with respect to its length and width so as to deliver, to separate points, gas from different parts of the charge, both across the sintering zone, from side to side, and lengthwise of the sintering zone, from end to end.

The inner wind box section 35, is connected to exhaust conduits 23 and 24, 25; and the outer section 36 is connected to conduits 21, 22 on either side. The reasons for this connection pattern is to deliver three different grades of gas, a strong rich gas to suction fan 19, a weaker rich gas to suction fan 20, and a weak gas to suction fan 18.

The operation of the sealing arrangement of FIG. 2 will now be described. The charge is indicated by 50, and the shrinkage cracks by 51. The charge is fed from hopper 11, ignited by muffle 12, passed through the sintering zone, and discharged at the dumping compartment 13, all in a conventional manner.

When the charge is fed to the machine, it fills the entire grate space between pallet walls 30. As the charge progresses through the sintering zone, and becomes roasted, it shrinks away from the side walls 30, leaving the shrinkage spaces 51 through which air can leak.

Vacuum is applied to both the inner wind box section 35 and the outer section 36. The vacuum applied to the inner section 35 draws relatively rich sinter gases down through the center of charge 50 and grate 29 and does not draw any leakage air from the side edges through shrinkage spaces 51.

However, these relatively rich gases are less strong at the beginning of the sintering zone near muffle 12 and at the end near dumping compartment 13. These weaker rich gases are drawn through end conduits 24, 25 into suction fan 20 which may then deliver the gases to suitable gas cleaning apparatus.

Toward the mid point of the sintering zone between ignition muffle 12 and dumping compartment 13, the gases drawn into the inner section 35 are normally somewhat richer than at the ends of the sintering zone. These strong rich gases may be delivered by conduit 23 to exhaust fan 19 which may deliver these strong rich gases to a chemical plant.

Gases drawn through the grate 29 between inner seals 44, 45 and outer seals 38 pass into the outer section 36 where they are delivered by conduits 21 and 22 to fan 18 which may deliver these gases directly to atmosphere. These gases contain only a small part of the products of combustion of the charge 50, and contain mostly leakage air which leaks through the outer seals 38, and the shrinkage spaces 51.

In some cases the strong rich gas draft fan 19 and conduit 23 may be omitted, especially in sinter plants where no use is made of sulphur dioxide bearing sinter gas for by-product manufacture. In such cases, all of the rich gases may be delivered to the rich gas fan 20, and the weak, air-rich gas to suction fan 18.

It is preferred to maintain a slightly higher vacuum in the outer wind box section 36 than in the inner section 35, so that any leakage at the inner seal 44, 45 will result in flow from the inner section 35 to the outer section 36 and thus not dilute the relatively rich gas delivered by the inner section 35 or wind box proper.

Referring now to FIG. 3, a down draft machine is shown having a water seal for the removal of solids caught by the bottom hopper of the wind box. Here the parts corresponding to the parts in FIG. 2 are given similar reference characters, with primes added. To simplify the disclosure no further explanation of such parts will be given.

The bottom of the wind box 15' has a trough 55 for holding water. The bottom has a slope or ramp 56 to permit a workman to reach in with a suitable tool to remove the solids which drop from the grate and collect in the water bath, without stopping the machine.

The water level in the wind box sections 35' and 36' is denoted by 57 and the water level in the clean out trough is indicated by 58. The difference in water level is caused by the amount of vacuum applied to the wind box. The water level 57 is shown at the same height in inner section 35' and outer section 36' because the difference in vacuum in these sections may be very slight, if any.

The operation of the machine of FIG. 3 is similar to that of FIG. 2 and will not be further explained.

Referring now to FIG. 4, an updraft machine will now be described. Here the pallets 60 comprise frames 61 having grates 62 and vertical side walls 63 to hold the charge 64. The pallets have wheels 65 riding on tracks 59, similar to FIGS. 2 and 3.

The suction wind box 66 is located above the pallets 60. It comprises an inner section 67 and an outer section 68. The inner section 67 communicates with a conduit 69 leading to a suitable suction fan (not shown). The outer section 68 communicates with a conduit 70 leading to a suitable suction fan (not shown). The conduit 70 has a butterfly damper 71 to balance the pressure or suction in outer section 68 in relation to the pressure or suction in inner section 67.

For sealing the outer wind box section 68 to the pallets, the pallets 60 have upper sealing surfaces 74 and the outer side walls of the wind box have sealing strips 75. Adjustable sealing bars 76 close the space between the pallet sealing surfaces 74 and the wind box sealing strips 75. These bars 76 are held in position by weights 77 hanging from levers 78 pivoted at 79 and operating through rods 80.

The seals for the inner wind box section 67 comprise strips 81 attached to the inner walls of the wind box, which actually cut into the material of the charge 64 near shrinkage spaces 82.

The lower wind box 84 has sealing strips 85 cooperating with lower sealing surfaces 86 on the pallets 60. The space between these sealing members is sealed by lower sealing bars 87 held in position by weights 88 on levers 89 pivoted at 90 and acting through rods 91.

The lower wind box 84 has a conduit 93 for supplying air under positive pressure by a blower (not shown). In some cases the lower wind box and lower seals may be omitted in which event the draft through the charge 64 will be caused entirely by suction applied to the inner and outer wind box sections 67, 68.

The operation of FIG. 4 is similar to the operation of the form shown in FIG. 2. The richer gas is delivered by the inner wind box section 67 where there is less chance for air leakage. The weaker gas is delivered by the outer section 68; this gas includes air leaking through the shrinkage spaces 82 and also through the outer seals at sealing bars 76.

It will be understood that the several mechanical seals may be replaced by other types of mechanical seals. It will be understood also that the several pallet seals are built in sections, corresponding to the length of a pallet, so that the pallets are sealed against the wind box throughout the entire length of the wind box along that part of the sinter path between the charge hopper 11 and the dumping compartment 13. End seals or dead plates (not shown) may also be provided at the ends of the wind box (adjacent the charge hopper and dumping compartment).

The invention has numerous advantages. It provides rich gases for by-product manufacture without requiring expensive hooding or gas recirculation as in some present sulphur dioxide systems. It reduces the gas volume which must be handled by gas cleaning apparatus such as a bag house. The inner seals being located inside the wind box, makes it possible to retain conventional external sealing devices, such as counterweighted sealing bars which have long proved their effectiveness in reducing air leakage at the sides of the wind box. Because of these inner seals, leakage air passing between the shrinkage charge and pallet side walls is drawn away from the main body of strong gas, thus preventing dilution of strong gas.

The invention is relatively simple in construction and operation. It has low installation cost and is easily adapted to existing sintering machines. Because of the exclusion of atomspheric leakage air from the main body of rich gas, the average temperature of the gas handled by the fans and connecting ducts is appreciably higher, thereby decreasing corrosion effects which lower temperature gas has on the metal of such fans and ducts.

While certain novel features of the invention have been disclosed herein, and are pointed out in the annexed claims, it will be understood that, in accordance with the doctrine of equivalents, various omissions, substitutions and changes may be made by those skilled in the art without departing from the spirit of the invention.

What is claimed is:

1. The method of operating a sintering machine, said sintering machine comprising a conveyor having a grate with longitudinal side walls rising above said grate, said grate and side walls forming a receptacle to hold a charge to be sintered, said charge and grate constituting a sinter bed, said method comprising igniting said charge, passing gases through said bed to sinter the charge, as a result of which said charge shrinks away from said side walls and forms shrinkage spaces at said side walls, delivering to a first point gases passing through said shrinkage spaces, and separately delivering to a second point gases of combustion from said bed between said shrinkage spaces.

2. The method of claim 1, applying a vacuum to said sinter bed at said shrinkage spaces to pass said gases therethrough, and applying a vacuum to said bed between said shrinkage spaces to pass said gases therethrough, said first vacuum being slightly higher than said second vacuum.

3. In a counter vacuum wind box seal for a sintering machine, a trackway, a conveyor riding on said trackway, said conveyor comprising a grate and longitudinal side walls above said grate, said grate and side walls forming a receptacle to hold a charge to be sintered, said charge and grate constituting a sinter bed, a wind box adjacent said bed, said wind box comprising an outer section and an inner section, outer sealing means, one on each side of the wind box, between said outer section and portions of said conveyor outside said grate, inner sealing means, one on each side of the wind box, between said inner section and the portions of said bed adjacent the space created by shrinkage of the charge away from said side walls, means connected to said inner section for applying a draft to the central part of the charge for delivering relatively rich gas, a second means connected to said outer section for applying a draft to the shrinkage space for delivering a relatively weak gas.

4. In the wind box seal of claim 3, said wind box being located under said conveyor, said outer sealing means comprising longitudinally extending members on said conveyor and on the upper portions of said outer wind box section, said inner sealing means comprising longitudinally extending members on the lower side of said conveyor and on the upper portions of said inner wind box section.

5. In the wind box seal of claim 3, said wind box being located above said conveyor, said outer sealing means comprising longitudinally extending members on said conveyor and on the lower portions of said outer wind box section, said inner sealing means comprising longitudinally extending members on the lower portions of said inner wind box section disposed low enough to enter the charge.

6. In a counter-vacuum wind box seal for a sintering machine, a track, a series of pallets riding on said track, each pallet comprising a frame having bottom outer sealing members, one on each side, each pallet having a series of grate bars between said sealing members and upstanding side walls above said sealing members, said grate bars and side walls forming a receptacle to hold a charge to be sintered, said frame also having bottom inner sealing members, one on each side, said inner sealing members being spaced inwardly from their corresponding outer sealing members, a wind box under said pallets, said wind box comprising an outer section with outer sealing members engaging said pallet outer sealing members, said wind box comprising an inner section with inner sealing members engaging said pallet inner sealing members, said inner section having an exhaust conduit for connection to an exhaust fan for drawing relatively rich gases down through said grate bars, said outer section having an exhaust conduit for connection to an exhaust fan for drawing relatively weak gases down through those grate bars between said pallet inner and outer sealing members.

7. In a counter-vacuum wind box seal for a sintering machine, a track, a series of pallets riding on said track, each pallet comprising a frame having upper, outer sealing members, one on each side, each pallet having a series of grate bars between said outer sealing members and side walls adjacent said sealing members, said grate bars and side walls forming a receptacle to hold a charge to be sintered, a wind box over said pallets, said wind box having an outer section with outer sealing members engaging said pallet upper outer sealing members, said wind box having an inner section with inner sealing members engaging the top of said charge, said inner section having an exhaust conduit for connection to an exhaust fan for drawing relatively rich gases up through said charge, said outer section having an exhaust conduit for connection to an exhaust fan for drawing relatively weak gases from the portions of those grate bars between said inner and outer sealing members.

8. In the seal of claim 7, said pallet frame also having lower sealing members, one on each side, a lower wind box under said pallets, said lower wind box having sealing members engaging said pallet lower sealing members.

References Cited in the file of this patent

UNITED STATES PATENTS

| | | |
|---|---|---|
| 1,774,135 | Fassotte | Aug. 26, 1930 |
| 2,878,009 | Bailey et al. | Mar. 17, 1959 |
| 2,989,395 | Meyer | June 20, 1961 |